United States Patent [19]

Kume

[11] 4,285,249

[45] Aug. 25, 1981

[54] APPARATUS FOR CAUSING AXIAL MOVEMENT

[75] Inventor: Takeshi Kume, Amagasaki, Japan

[73] Assignee: Kabushiki Kaisha I.T.L., Kobe, Japan

[21] Appl. No.: 109,563

[22] Filed: Jan. 4, 1980

[30] Foreign Application Priority Data

Feb. 19, 1979 [JP] Japan ................................. 54-18594
Sep. 18, 1979 [JP] Japan ............................... 54-120533

[51] Int. Cl.³ ....................... F16H 27/02; F16H 29/02
[52] U.S. Cl. ............................... 74/89.15; 74/424.8 R
[58] Field of Search ............ 74/89.15, 424.7, 424.8 R, 74/424.8 A; 85/46, 47, 32 R, 32 V

[56] References Cited

U.S. PATENT DOCUMENTS

| 647,491 | 4/1900 | Hoffmann | 74/424.7 |
|---|---|---|---|
| 671,274 | 4/1901 | Fischer | 85/46 |
| 1,500,099 | 7/1924 | Anderson | 74/424.8 A |
| 2,883,183 | 4/1959 | Finsterwalder et al. | 74/89.15 X |
| 3,440,886 | 4/1969 | Meeker | 74/89.15 X |

FOREIGN PATENT DOCUMENTS

| 895634 | 3/1972 | Canada | 74/89.15 |
|---|---|---|---|
| 672883 | 3/1939 | Fed. Rep. of Germany . | |
| 1477821 | 6/1977 | United Kingdom . | |

*Primary Examiner*—Lawrence J. Staab
*Attorney, Agent, or Firm*—Merriam, Marshall & Bicknell

[57] ABSTRACT

This disclosure relates to drive apparatus including a rotatable member and a relatively fixed or non rotatable member. The two members are coupled by a thread type arrangement whereby one of the two members is moved linearly relative to the other when the rotatable member is rotated. The rotatable member includes a cylinder and a plurality of rollers attached to the outer periphery of the cylinder. The rollers are arranged in a helical line and extend radially outwardly from the cylinder. The fixed member includes a semicylindrical wall having a plurality of slots or channels formed in it, the channels also following a helical line that is similar to the line followed by the rollers. When the rotatable member is turned on its axis, the rollers move through the channels and cause relative linear movement of the two members.

4 Claims, 6 Drawing Figures

APPARATUS FOR CAUSING AXIAL MOVEMENT

The present invention relates to improved apparatus or mechanism for causing relative linear movement of a rotary member and a fixed member, the movement being parallel to the axis of rotation, by virtue of a thread type relationship between the members.

Thread type mechanisms for producing linear movement have conventionally been used as elements of various types of machines and other apparatus, since such mechanisms, if they have accurate threads, are accurate in movement or operation and produce a relatively strong, axial thrust. In many examples of such mechanisms, the male threaded member is rotatable and axially fixed while the female member that engages the male member is held against rotation so that it moves axially or linearly. Such axial movement is usually limited to relatively short distances because a long threaded male member is difficult to machine with high accuracy because an intermediate portion of such a long member is likely to bend during machining.

It is a general object of this invention to provide an entirely novel and improved type of apparatus wherein a rotatable member can move axially along any given length of a fixed member or channel.

Apparatus according to this invention comprises a cylindrical rotatable member which can be driven by a suitable drive means, and a fixed member. The rotatable member has a series of idling rollers attached to the peripheral wall thereof to form a spiral line or helix, each of the rollers having its axis of rotation extending radially of the cylindrical rotatable member. The fixed member is generally semi-cylindrical and has a number of slots or channels formed therein which form a series of separate portions of a spiral channel or track having the same pitch as the spiral line on which the idling rollers are located so that the rollers can, when the cylindrical member is rotated, roll along or through the slots similar to a threaded relationship.

The foregoing and other objects and features of this invention will become more apparent from the following detailed description of a preferred embodiment thereof, by way of example, taken in conjunction with the accompanying drawings, in which.

Figure 1:
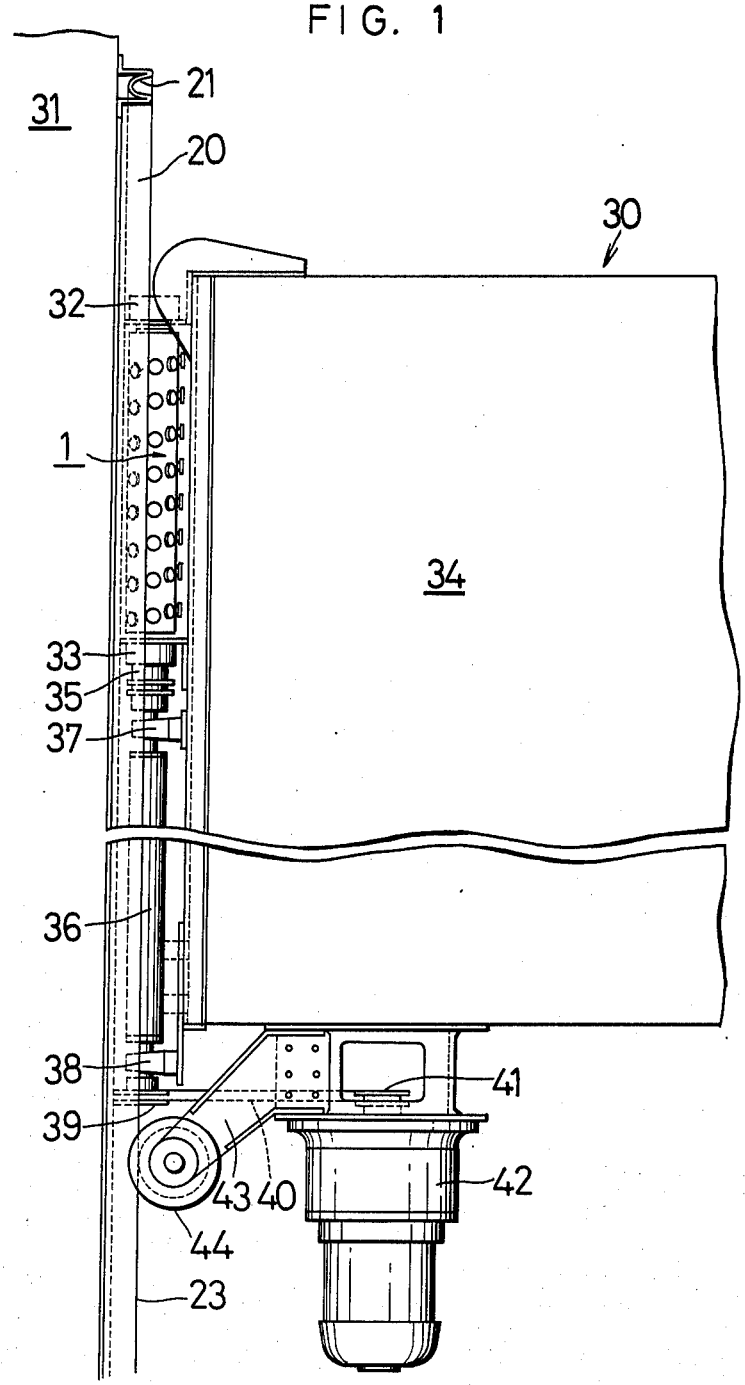
FIG. 1 is a schematic view of apparatus including the present invention, showing an actual use.
Figure 2:
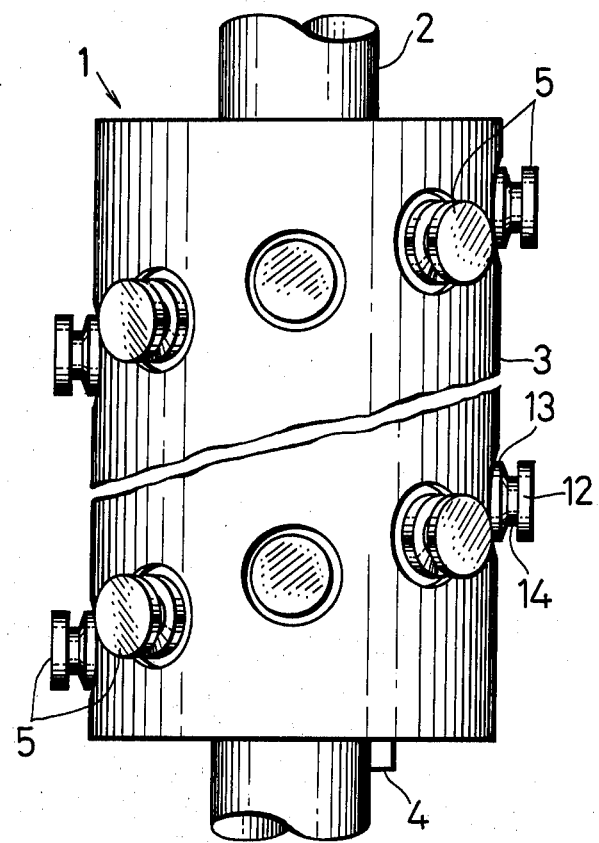
FIG. 2 is an enlarged side view of a rotatable member in accordance with the invention.
Figure 3:
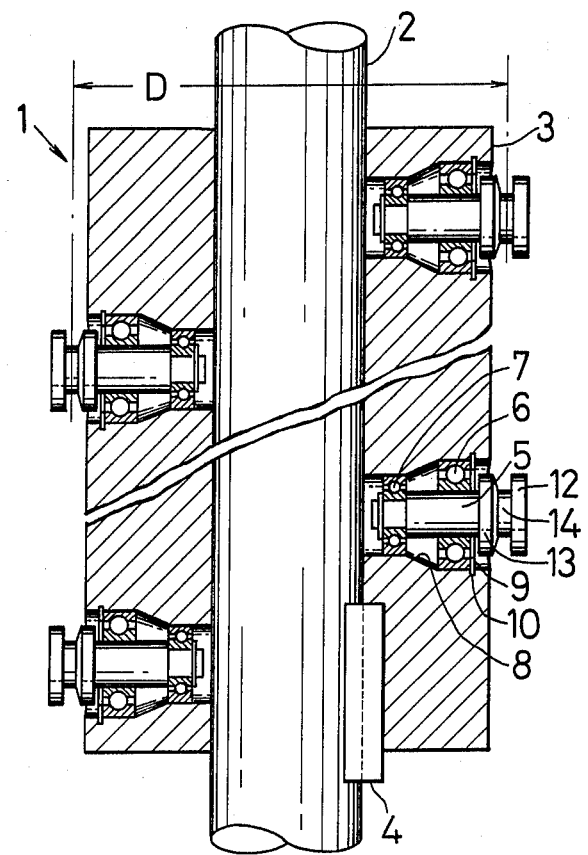
FIG. 3 is an axial section of the member shown in FIG. 2.

Referring first to FIGS. 2 and 3, the rotatable member 1 includes a shaft 2 which can be driven by a suitable means as will be described in connection with FIG. 1, a cylindrical sleeve 3 surrounding and fastened by key 4 to the shaft 2, and a plurality of idling rollers 5 rotatably attached to the sleeve 3. Each roller 5 has its axis extending radially of the sleeve 3 and it is rotatably supported by radial ball bearings 6 and 7 (FIG. 3) secured within a radial bore 8 formed in the sleeve 3. Each roller 5 is held in the bore 8 by a snap ring 9 received in a groove 10 in the bore 8. Each roller 5 has an enlarged outer head or flange 12 and an inner flange 13 that form a peripheral groove 14 therebetween, which must be located radially outward of the peripheral surface of sleeve 3. As best shown in FIG. 2, the rollers 5 are mounted along a helical line around the sleeve 3 similar to a thread.

Figure 4:
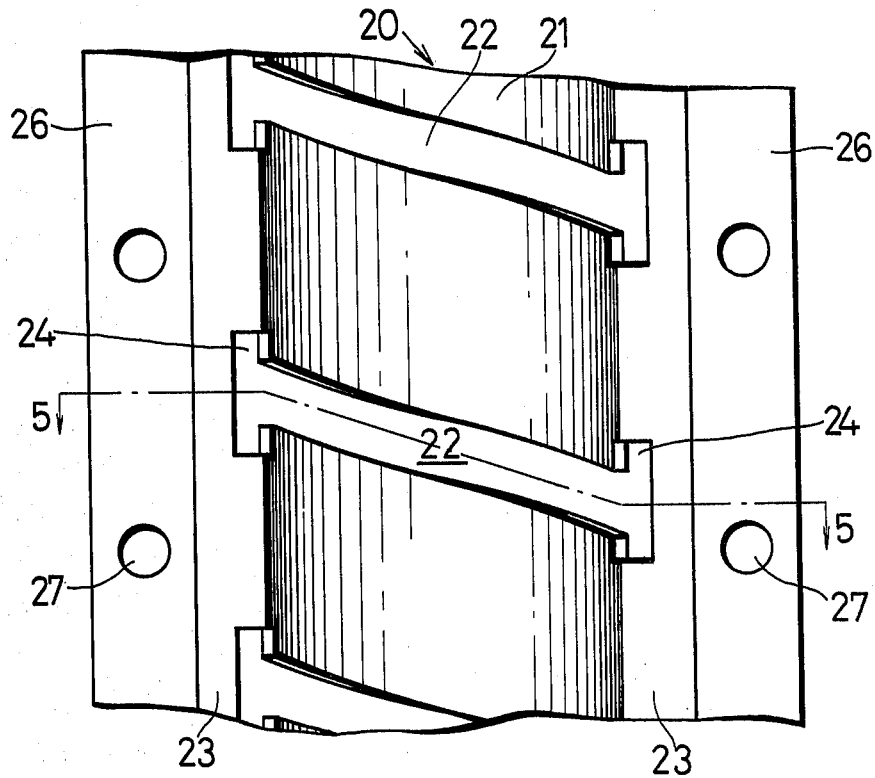
FIG. 4 is a fragmentary enlarged view of a fixed member in accordance with the invention, taken on line 4—4 of FIG. 5.
Figure 5:
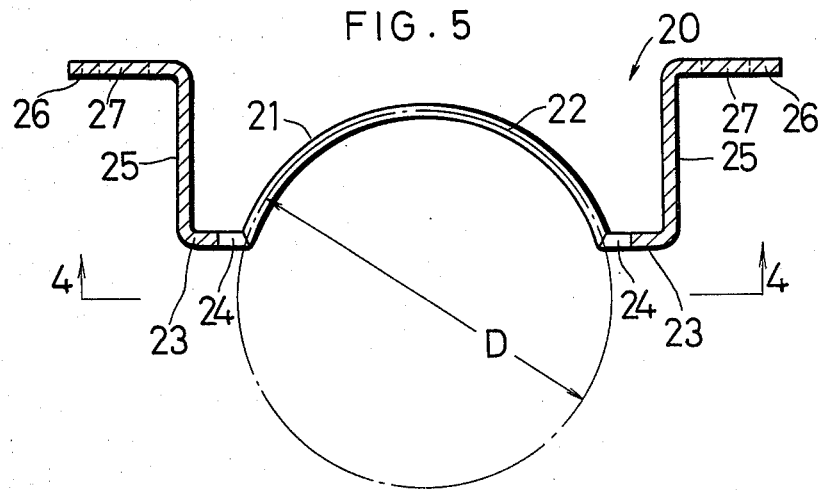
FIG. 5 is a sectional view taken on line 5—5 of FIG. 4.

Referring now to FIGS. 4 and 5, the fixed member 20 includes a semi-cylindrical wall 21 having a cross section which is approximately half, or a smaller fraction, of a circle as shown in FIG. 5. The circle has a diameter D (FIGS. 3 and 5), one-half of which substantially equals the radial distance between the axis of shaft 2 of rotary member 1 and the center line of the peripheral groove 14 of each roller 5. The semi-cylindrical wall 21 has a series of slots or channels 22 formed thereacross which form separate portions of a helical line or track which would extend continuously if the wall 21 were a complete or closed cylinder, the helical line having the same pitch as the spiral line on which the rollers 5 are mounted. Thus, the same spiral line would extend through both the channels 22 and the peripheral grooves 14 of rollers 5.

The fixed member 20 further includes a pair of banks 23 (FIGS. 4 and 5) extending along both sides of the semi-cylindrical wall 21 and in the present example, away therefrom in a plane that is parallel to the axis of the wall 21. Each slot or channel 22 terminates at its opposite ends in axially enlarged ports 24 formed in the banks 23, the ports being sized so that the roller heads 12 can pass freely therethrough. Side walls 25 and flanges 26 are formed along the banks 23.

The fixed member 20 may be easily manufactured by punching the grooves 22 and the ports 24 in a metal band or sheet, bending the sheet to form the semi-cylindrical wall 21, the banks 23, a pair of side walls 25 and a pair of flanges 26, and finally punching holes 27 in the flanges for use in fastening the member 20 to a wall or the like. The fixed member 20 could instead be produced relatively easily by machining a metal material.

It will be understood that any desired length of the fixed member 20 may be made by interconnecting end-to-end sections of the member 20 designed so that the slots or channels 22 lie on the continuous predetermined spiral line or track when the sections are connected. Thus, each unit member 20 can be an axially short section and thus easily produced.

Figure 6:
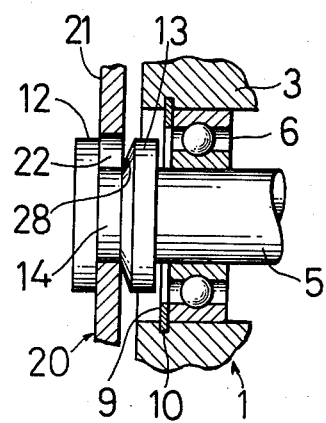
FIG. 6 is a fragmentary enlarged view in axial section showing the rotatable member engaging the fixed member.

FIG. 6 shows the engagement of a roller 5 with one of the slots 22 of the fixed member 20. The peripheral groove 14 of each roller 5 has a width that is equal to or longer than the thickness of semi-cylindrical wall 21 of fixed member 20, and it has a diameter less than the width of slot 22. The radius of the outer roller head 12 is preferably sized so that, when the peripheral groove 14 rides on the lower edge of each channel 22 as shown, the inner side of the head 12 does not contact the outside of the upper edge of the channel 22, and there is no friction between them during rolling of the roller. Otherwise, the inner side of the head 18 may be beveled or outwardly conical to prevent frictional engagement with the wall 21. The outer side 28 of flange 13 is preferably outwardly conical as shown to prevent frictional engagement with the wall 21.

If the diameter of each outer head 12 is smaller than the width of each slot 22 of the fixed member 20, the rollers 5 can be placed into assembly or engagement with the channels 22 by inserting the rollers into the channels from the inner side of the semi-cylindrical wall 21. If the diameter of each outer head 12 is greater than the width of each slot 22 to ensure secure engagement of the parts, such assembly or engagement can be brought about by positioning one end of the sleeve 3 of the rotary member 1 at one end of the fixed member 20 and coaxial with each other, and then turning the rotary member 1 while moving it toward the fixed member 20 so that the rollers 5 pass through the first port 24 of the first slot 22, and then successively through adjacent slots 22. Alternatively, this may be done by positioning the rotary member 1, without the rollers 5, coaxially with the semi-cylindrical wall 21 of the fixed member 20, attaching some of the rollers 5 to the rotary member 1 at the open side of fixed member 20, turning the member 1 to place the attached rollers into engagement with the slots 22, attaching additional rollers 5, turning the member 1, and repeating such steps.

Reference is made now to FIG. 1 showing the present apparatus as used to move an elevator 30. Secured to a wall 31 of a building is a desired length of the fixed member 20 with its long dimension or axis directed vertically. A length of the rotary member 1 is rotatably supported on an elevator box 34 by a thrust bearing 32 and a bearing 33, both of which are fastened to a side wall of the elevator box 34. Rollers 5 of the member 1 engage some of the slots 22 of the fixed member 20. The shaft 2 of the rotary member 1 is connected at its lower end through a flexible coupling 35 to a connecting shaft 36 that is rotatably supported by a pair of bearings 37 and 38 fastened to the elevator box 34. The rotary member 1 can be rotated by a drive including the coupling 35, the shaft 36, a sprocket 39 secured to the lower end of shaft 36, a chain 40 meshing with the sprocket 39, and another sprocket 41 secured to the shaft of an electric motor 42 having reduction gears. A brake and other necessary devices may be provided and secured to the bottom of the elevator box 34.

Secured to the bottom of elevator box 34 are a pair of brackets 43. An idling wheel 44 is supported on one end of brackets 43 and runs on the two banks 23 of the fixed member 20 to withstand the moment or load at the bottom end of the elevator on the fixed member 20, in cooperation with the rollers 5 of rotary member 1 that engage the channels 22, during heavy loads. The wheel 44 may have side flanges as shown that extend over the side walls 25 to hold the wheel 44 in proper position on the member 20.

It will be understood that the elevator 30 may be provided with a pair or a plurality of rotary members 1 in axial alignment with each other to share the loads, or parallel members 1 and 20 may be provided to prevent the elevator box from rocking. Furthermore, the present system may include other guide or safety means, such as vertical guide rails fastened to the building wall 31 and guide rollers supported on the elevator box 34 and adapted to run along the rails, and thereby ensure the threaded relationship between the rollers 5 and slots 22. If such guide means is precise in maintaining the threaded relationship, each roller 5 might not require the outer head flange 12, thereby simplifying the rotary member 1 which would be light in weight.

Thus, according to this invention, the rotary member has a type of threaded engagement with the fixed member and is rotated to move axially or linearly along any selected length of the fixed member, for lifting a heavy load supported by the rotary member. The apparatus may be designed so that the rotary member moves axially along the fixed member when installed in any direction between the vertical and horizontal.

The following is a discussion dealing with the $\mu PV$ value which gives the limit of heating at the engaging point with a large load, where $\mu$ is the frictional resistance, P is the pressure and V is the peripheral velocity. The frictional resistance is low due to the rolling friction between the rollers 5 and channels 22, while the load on each roller 5 can be reduced by increasing the number of the rollers 5. Thus, the peripheral velocity of the rotary member 1 can be increased under the permissible heating limit to increase the speed of movement of the elevator. This can eliminate the necessity for reduction of the speed in the driving system, and thereby reduce the frictional losses.

The rotary member 1 supporting the load will move down the fixed member 20 by gravity when the member 1 is not driven and the brake is released.

What is claimed is:

1. An apparatus for causing axial, or linear movement which comprises a generally cylindrical rotary member having a series of idling rollers rotatably supported on the periphery thereof and located on a helical line, the center of the helix being on the axis of said rotary member, and a fixed member having a generally semi-cylindrical wall formed with a series of slots thereacross which lie on a helical line coaxial with said semi-cylindrical wall and having the same pitch as said helical line on which said rollers are located, each of said rollers having its axis extending radially of said rotary member and being adapted to roll through said slots when said rotary member is rotated, whereby said rotary member moves axially along said semi-cylindrical wall of said fixed member, each of said rollers having a peripheral groove and a radial flange such that said peripheral groove rides on one edge of one of said slots across said semi-cylindrical wall while said flange engages the outer wall of said edge.

2. An apparatus for causing axial, or linear movement which comprises a generally cylindrical rotary member having a series of idling rollers rotatably supported on the periphery thereof and located on a helical line, the center of the helix being on the axis of said rotary member, and a fixed member having a generally semi-cylindrical wall formed with a series of slots thereacross which lie on a helical line coaxial with said semi-cylindrical wall and having the same pitch as said helical line on which said rollers are located, each of said rollers having its axis extending radially of said rotary member and being adapted to roll through said slots when said rotary member is rotated, each of said rollers having a peripheral groove and a radial flange such that said peripheral groove rides on one edge of one of said slots across said semi-cylindrical wall while said flange engages the outer wall of said edge, whereby said rotary member moves axially along said semi-cylindrical wall of said fixed member, said fixed member further having a pair of banks formed along both edges of and extending away from said semi-cylindrical wall, each of said slots across said semi-cylindrical wall terminating in axially enlarged ports formed at both ends of said slots in said banks, through which said flange of each roller passes.

3. An apparatus as in claim 1 or 2, wherein said rotary member is mounted rotatably on a load and can be rotated by driving means attached to said load so that said load is carried by said rotary member axially along said fixed member.

4. Apparatus for use with a generally semi-cylindrical wall having helical slots therein, said apparatus comprising a generally cylindrical rotary member having a series of idling rollers rotatably supported on the periphery thereof and located on a helical line, the center of the helix being on the axis of said rotary member, each of said rollers having its axis extending radially of said rotary member and being adapted to roll through said slots when said rotary member is rotated, whereby said rotary member is adapted to move along said semi-cylindrical wall of said fixed member, each of said rollers having a peripheral groove and a radial flange such that said peripheral groove rides on one edge of one of said slots across said semi-cylindrical wall while said flange engages the outer wall of said edge.

* * * * *